United States Patent [19]

Ling

[11] 3,771,131

[45] Nov. 6, 1973

[54] OPERATING CONDITION MONITORING IN DIGITAL COMPUTERS

[75] Inventor: Andrew T. Ling, Palos Verdes Penninsula, Calif.

[73] Assignee: Xerox Corporation, El Segundo, Calif.

[22] Filed: Apr. 17, 1972

[21] Appl. No.: 244,397

[52] U.S. Cl. .......................... 340/172.5, 235/153 A

[51] Int. Cl. ............................................ G06f 11/00

[58] Field of Search ...................... 340/146.1, 172.5; 235/153; 324/73

[56] References Cited

UNITED STATES PATENTS

| | | | |
|---|---|---|---|
| 3,368,203 | 2/1968 | Loizides | 340/172.5 |
| 3,522,597 | 8/1970 | Murphy | 340/324 |
| 3,536,902 | 10/1970 | Cochran et al. | 235/153 |
| 3,540,003 | 11/1970 | Murphy | 340/172.5 |
| 3,599,091 | 8/1971 | Warner | 324/73 |
| 3,344,408 | 9/1967 | Singer et al. | 340/172.5 |
| 3,688,263 | 8/1972 | Balogh, Jr. et al. | 340/172.5 |

*Primary Examiner*—Paul J. Henon
*Assistant Examiner*—James D. Thomas
*Attorney*—Ralf H. Siegemund

[57] ABSTRACT

In a stored program digital computer, which includes memory, CPU and input/output equipment, and having a plurality of hardwired test points developing signals during operation of computer from which particular test points are selected. Upon execution of a selectable instruction by the CPU and in timed response to a preselected clock phase during the instruction, the signals as developed by the selected test points are received to provide an operational "snapshot" of the computer.

5 Claims, 5 Drawing Figures

OPERATING CONDITION MONITORING IN DIGITAL COMPUTERS

BACKGROUND OF THE INVENTION

The present invention relates to improvements in digital computer and computer systems, particularly of the stored program general purpose variety.

As computers and computer systems and the number of components therein increase in size, the detection of sources of malfunctions becomes a task of correspondingly increasing difficulty. An entire field has developed around the technique, called diagnostics, whose purpose is to provide hardware and software adapted to pinpoint sources of operational errors. Diagnostics involves the self-testing of a system or subsystem as well as testing of one machine by another. Diagnostics is not only relevant for pinpointing an error source that has produced an operational error, but should also be used in a precheck, anticipatory capacity.

One of the aspects of diagnostics is the fact that commonly it involves interfering with the operation of the machine. A crude intervention is physical testing of signal levels in particular test points, though ultimately, that may always be required once an error has been detected or is suspected in a particular module. No matter how refined, the known physical test procedures, including even function tests, require the computer to stop at or for the test.

A method more in line with software procedure uses test programs in form of algorithms which are designed to pinpoint indirectly an error source. Nevertheless, such diagnostic program is an intervention in the operation of a system. Moreover, the algorithmic procedure is limited particularly in case of self-testing of a system, and errors can be pinpointed only to the point of results of execution of any particular instruction. In many cases, diganostics is limited here to the simulation or generation of various kinds of operating conditions in the machine and checking the "status" of the machine thereafter, or checking a correctness of the result. These aspects are particularly important when considering that diagnostics is developed after the machine has been designed. This is a basic drawback, as it involves an inherent delay so that for early prototypes or breadboard modules diagnostics is not available. Furthermore, for function tests of systems or subsystems, specific implementation is not of immediate relevancy. Therefor, there is a need for developing a technique useful in diagnostics and which can be used already in the developing stage of a computer system or portions thereof.

DESCRIPTION OF THE INVENTION

It is an object of the present invention to provide for diagnostic capabilities in a computer or computer system that can operate without intervening at all in the operation of the system, particularly, as far as critical aspects is concerned. It is another object of the present invention to provide for hardware for diagnostic monitoring that permits extensive on line monitoring without physical intervention, permitting a completely new diagnostic procedure. It is another object of the present invention to provide for a function monitoring method and subsystem that can be used already in the early stages of development of a computer system. It is a further object of the present invention to provide for a diagnostic method and system that permits ready updating of the correct references to be used subsequently for running or occasional supervision.

In accordance with the preferred embodiment of the invention, it is suggested to provide hard-wired connections to test points located basically anywhere in the system, and including as many test points as is deemed (arbitrarily) necessary. A selectively operable switching arrangement selects a particular plurality of these test points as a set, and during likewise preselected operational phases the signals developed in the selected test points are set into a register (in the following called SNAP-register); a "snapshot" is being taken of a portion of the machine as far as signal pattern development is concerned. As hared-wiring to the several possible test points is a permanent installation in the system, it constitutes plural fixed parameters for the hardware design and does not amount to any physical intervention in the system when used subsequently. A snapshot can be taken now when ever the machine runs without any intervention whatever; the SNAP condition has been previously set up, and as the condition arises the snap-shot is taken while the machine proceeds without halting for or due to the test.

The snap condition may be the execution of one particular phase out of several phases in the execution of a particular instruction. Thus, the snapshot is taken during that execution, but the instruction is completely and uninterruptedly executed by the machine, including program continuation thereafter; the test does not halt, intervene or modify the computer. This snapshot feature is designed also for use in a test program in which all test points and all phases for each test point can be monitored. On line diagnostic machine testing can be completed with very little overall program intervention.

The hardware involved for snap shooting can be developed early in the development stage of a computer and connected to prototypes for function testing. The snapshot method permits also continuous updating and variation of the reference signal pattern with which the snapshots are compared. Also, hardwiring to new test points can be added as development progresses. This aspect remains true throughout, particularly after the developing and engineering stages have been completed and a completed system is in use. Moreover, the snapshot method is amenable to the development of its own reference patterns. Up-dating will become particularly useful when the computer system itself is extended, for example, by adding on terminals or other input/output devices.

The hardware and software for this technique may pertain to one computer while the test point wires are strung to another machine to avoid the possibility of off-setting errors in case of self testing. However, for running check on operability of all parts in a system, self testing is most convenient, and self testing procedure offers very high reliability for a machine that has been checked out initially otherwise.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a block diagram for the snapshot hardware to be used in conjunction with processing facilities of a computer system such as the CPU thereof;

FIG. 2 is a schematic representation of time periods involved in terms of operational phases and states of a computer during program execution;

FIG. 3 is a perspective representation of a three-dimensional diagram for a test point-time pattern;

FIG. 4 is a schematic representation of a test program; and

FIG. 5 demonstrates the relative location of test points and testing unit.

DESCRIPTION OF THE DRAWINGS

Proceeding now to the detailed description of the drawings, reference numeral 10 in FIG. 1 denotes a machine to be tested. Refinements of the system and various details and aspects will be explained later. For purposes of describing implementation of the basic concept of the invention, it can readily be assumed that 10 denotes a complete computer system, including CPU, memory, input-output equipment, and processors. That system is contained in many PC-boards holding discreet components, IC's and LC's. These modules and components have numerous test points which are built-in. From these "strategic" ones have been selected, and hard wired circuit lines lead from these particular test points to the particular snapshot system which is the subject matter of the invention.

These lines from the several test points are collectively identified at 11. Their being hard wired is important as no connections are made or have to be made just for testing to be removed subsequently. Conveniently, one can think of these lines 11 in parts as additional back wiring wires (or PC lines on a back wiring board) leading in the back wiring plane to the snapshot system hardware, contained on additional boards within the frame and chassis that containes the CPU.

Figure 1:
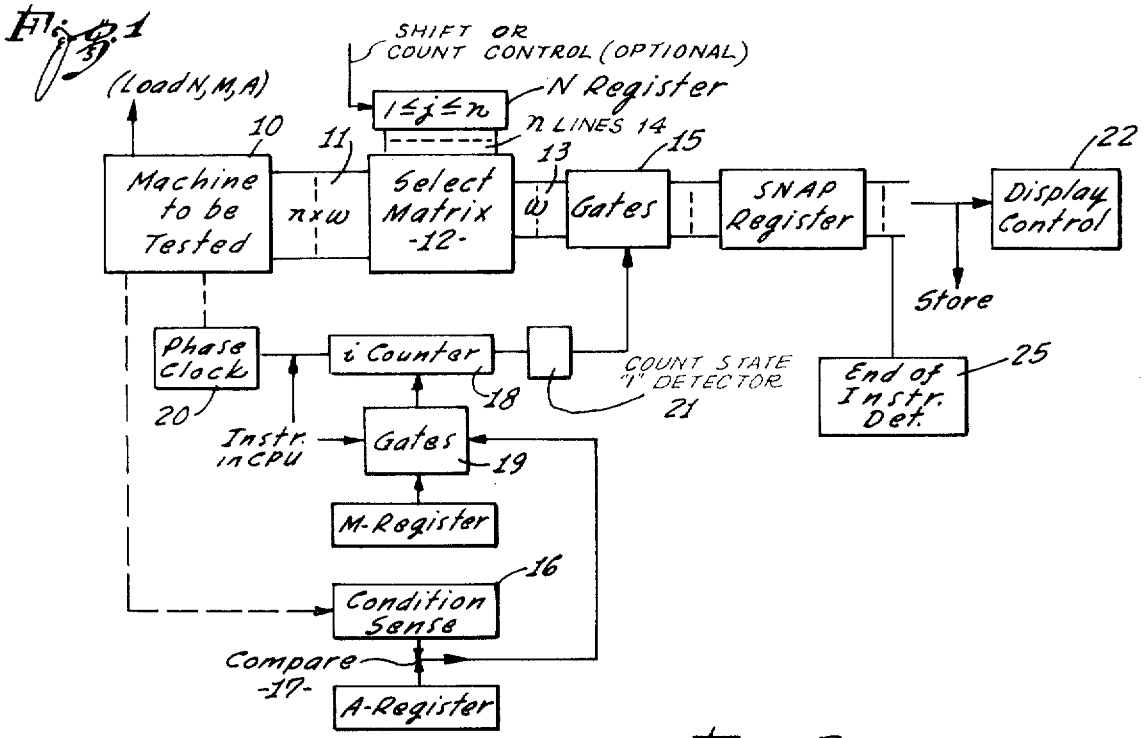

These test points have been particularly organized and their number is selected to be expressed by the product *n X w*, wherein *n* and *w* are positive integers. W is the number of test points grouped under any one set, and n is the number of sets made available. The total number of test points as per the relation *n X w* is called a frame. Basically, the invention could be practiced with an arbitrary assignement of test points to a set. On its face, that is not the preferred way of practicing the invention. One will group the test points in such a manner that those which are expected to undergo change in signal level or have uniquely defined signal level state for any particular phase of operation of and in the machine, are grouped together in a set.

It should be noted that under the broad concept a test point could be assigned to more than one set so that the total number of actual (physical) test points is less than the number *n X w*. This aspect is mentioned here to state the generalized case; for purposes of the invention, it is not necessary to go into details along that line, because the selection of test points depends on the hardware specifics of the machine.

The *n X w* lines from all the test points lead to a selector switching matrix 12. The matrix has *w* output lines 13 and operates by selecting *w* input lines from the lines 11 and connecting the selected lines to the output lines 13. Basically, of course, the number *w* is arbitrary, but it is apparent that that number should be compatible with the format used in the machine. If the computer uses a 32 bit word format, the number *w* is preferably 32 and that number will be presumed. Thus, the switching matrix 12 provides for the actual assignment of respective 32 test points to a set, and that assignment is carried out by connecting 32 of the test points to the 32 lines 13.

The switching matrix is under control of a set selector or N-register. The register may be a shift register or a regular register or binary counter with a full decoder in its output circuit. A regular register suffices if its content is changed only by software operation. The N-register, however, should be understood as counter bearing in mind that counting proper may in principle result from software or hardware operation, though software counting is preferred. The register facility N with decoder is provided for controlling *n* output lines 14, only one at a time being enabled. That, in turn, operates one set of 32 switches in matrix 12, and these are the switches that connect 32 of the lines 11 to the 32 lines 13.

The content of register N is subject to two controls. (a) the register or counter N can be loaded, whereby a particular switching state in matrix 12 will result. (b) the content of register N can be incremented and/or decremented. Either operation will cause a change in the selection of the set of test points. Loading will be used for the sporadic or "random" monitoring, and/or for initiating a test sequence that continues, for example, by incrementing the content of register N, for scanning through some, many or all of the test points. However, if the facility N is a simple register, and if counting is carried out by software, the register N is reloaded for each new selection of a set of test points.

The 32 lines 13 hold at any instant signals which represent the electrical state of 32 selected test points. As long as the selection persists, the signals on lines 13 change with any change in signal level on the selected test points. These signals can be sent into a SNAP-register through gates 15. The timing of gating the selected test point signals into the SNAP-register is important for the invention. The timing is quite short, i.e., the gates 15 are open for a very brief period such as a clock pulse, to obtain a fixed representation of the signal state as then presented on lines 13. A "snapshot" is taken from these 32 test points by the gating operation, and these signals are set as binary signals or bi-valued bits into the SNAP-register. The timing of "snapshooting" is determined as follows:

A register A is provided to hold a digital representation of a particular machine state. In other words, the A-register contains an arbitrarily selectable representation as to the circumstance of testing. The A-register has its output circuit connected to a comparator 17 receiving also signals from a condition sensing circuit 16. The condition sensing circuit is connected to the computer 10 for the comparator 17 to determine when the circumstance of testing is actually present in the computer.

For example, the A-register may hold the operational code for a particular instruction. Alternatively, and in the preferred form of practicing the invention, the A-register may hold a memory address, which is "known" to hold a particular instruction. Therefore, the content of the A-register defines a particular period during which the "snapshot" is to be taken, but not the instant of taking.

The condition sense circuit 16 may be a gating structure that connects to the program counter in the CPU of the computer. Whenever that counter reaches the instruction address as identified in the A-register, comparator 17 responds. Alternatively, the condition sense circuit 16 may be a gating structure that connects to the memory addressing bus as leading from the CPU to memory, so that the machine condition defining the circumstance of "snapshooting" may encompass any operation that relates to the accessed memory location and its content. In either case, the condition sense circuit 16 on one hand, and the A-register on the other hand, search for a particular machine-definable state which can be expressed logically and is, in fact, programmable as to its occurrence.

As ultimately all parts of the computer system should be tested in that manner, the various machine states should be defined so that many or all possible operational states cover the entire system simply by changing digital representation defining the states. It was found most convenient to use the memory addresses as a state defining criterium and its digital representation; the test state being in existence when a selected memory address is called on. The selection is made by the content of the A-register, the sensing circuit 16 and comparator 17 probe for presence of the test state criterium on basis of the selection.

Assuming that the sensing circuit 16 connects to the program counter, the machine will be tested upon execution of the instruction held in that memory location. Such an execution of a computer involves many clock phases and particular operations are carried out in each step. Some are specific to the instruction; some instructions involve numerous steps and compounded operations, such as passing large streams of data within the system. Therefore, testing is only meaningful if restricted to one step. In all these cases, machine clocking defines the steps. Moreover, the (fastest) clock, e.g., in the CPU, defines the smallest period during which test point signals in the CPU will not change, but many test points may change their signal level from clock pulse to clock pulse. Thus, it is only for one clock pulse period that the signal pattern on the several test points can be regarded with certainty as "frozen."

The snapshot circuit includes an M-register holding a particular number *i*. That number represents that, e.g., *i*-clock pulses after the operational phase as defined by the content of the A-register has actually begun, the snapshot is to be taken. The number *i* is set in parallel into a (true hardware) counter 18 by means of gates 19, whenever comparator 17 has sensed agreement between A-register content and condition sense. Thus, the counter 18 is loaded when the machine is about to begin execution of the instruction held in the particular memory location as defined by the content of the A-register. This last statement must be qualified. Strictly speaking, if the condition sense circuit 16 responds to the program counter content, instruction execution does not commence at that point, but only after the instruction has been fetched from memory. Thus, gates 19 may require additionally a delayed enabling signal that represents the actual arrival of the instruction in the CPU, e.g., loading of the instruction register therein.

The machine 10 is assumed to possess a phase clock or the like. This can be understood in the general sense; it does not have to be the fastest machine clock. CPU's usually have phase counter stepping. For example, the CPU through particular cycles of basic operations is individually modified by instruction particulars so as to avoid hardware duplication. Basic operations are, for example, operand fetch, indexing, register memory-to-hard-ware, accumulate or transfer, etc. A finer subdivision or phase is possible and used, because, as stated above, the fastest clock represents the highest meaningful resolution of the development of signal patterns in the machine. Generally, the unit 20 can be understood as a suitable machine clock, preferably the fastest one. The clock is coupled to counter 18 upon transfer of the number *i* thereto.

The content of counter 18 is counted down at clock rate, and when count state 1 (decimal) is reached the desired instant of snapshooting has arrived. Count state 1 is monitored by an appropriate detector 21 and when responding, the count state 1 signal is used to open the gates 15. This is about equivalent to opening the shutter for snapshooting in photography. The test point signals are set into the SNAP-register *i*-clock pulses in the execution of the instruction as indirectly defined by the content of the A-register.

Figures 2, 3:
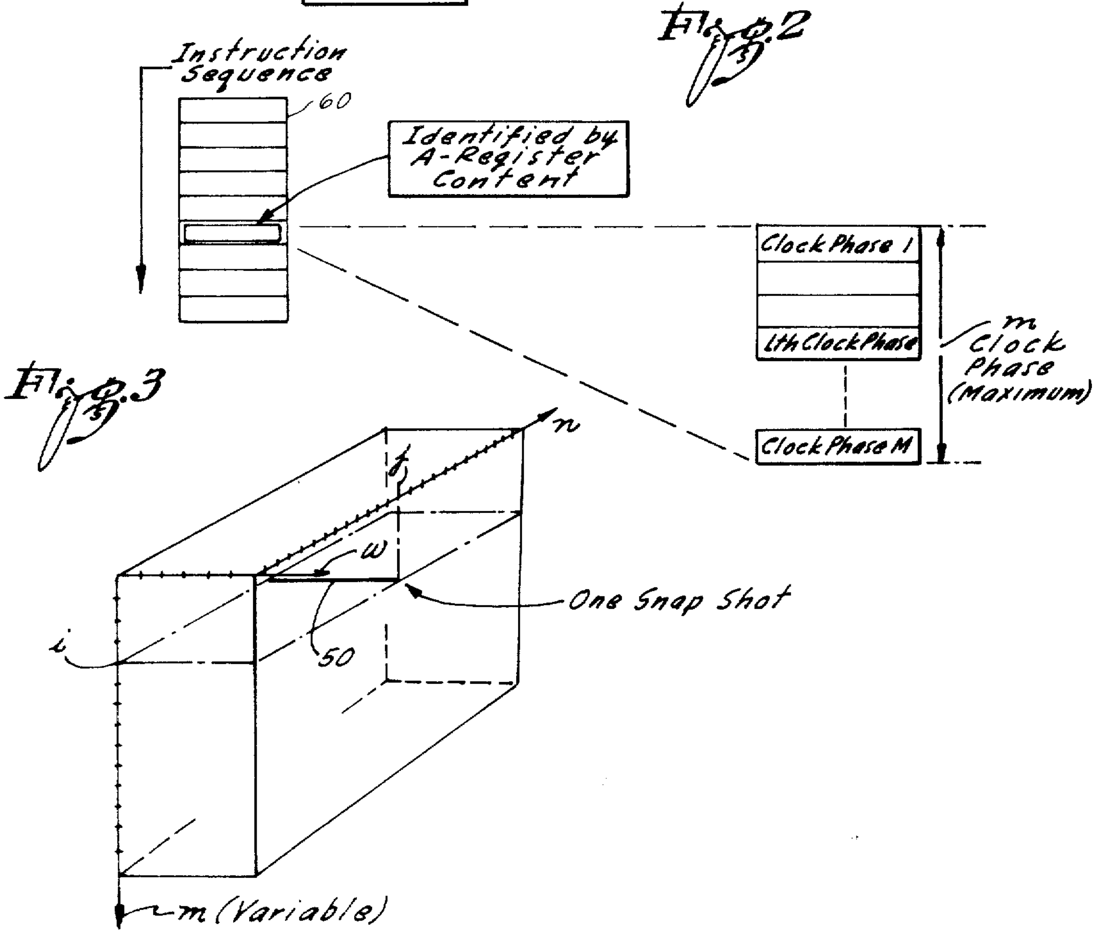

The timing of snapshooting can be understood also from FIG. 2. As schematically shown, column 60 represents a program that is executed. Each box represents an instruction of that program. One particular instruction is identified in that its location in memory is represented in the A-register. That instruction requires m-clock phases for execution. During the $^{th}$ phase, the signal pattern on the $j^{th}$ set of test points is to be ascertained. This $j^{th}$ set is selected by switching matrix 12 on basis of the content of the N-register; the $i^{th}$ clock phase is selected on basis of the content of the M-register and upon counting the number i down to zero in counter 18. That counting process begins after circuits 16/17 have detected that, indeed, the instruction sought to be tested is about to be executed.

In the most simple form of practicing the invention, the content of the SNAP-register is fed to a display panel and an operator can compare, for example, the display with an appropriate chart or the like. Somewhat more sophisticated is the control of a plotter for charting the various snap-shots as taken, for example, in a particular sequence. Still, alternatively, a hard-wired register or preselector switches may be provided and the content of the SNAP-register is compared with such preselections. In case of agreement nothing happens. In case of disagreement, a warning indicator may go on.

These various possibilities are grouped under the indicator 22 in FIG. 1 and do not require more detailing. In any event, it can readily be seen that the evaluation of the content of the SNAP-register may be carried out through immediate and direct outputting of the content of the SNAP-register to a facility that permits that indication and inspection by a human operator.

It can, thus, be seen that operational testing can be performed without any interruption or disconnection within the machine system whatever. The test as described is performed during any program execution without any further program intervention of any kind. In other words, the program is not interrupted, not even temporarily halted. The program will continue regularly and the snapshooting operation is carried out strictly in parallel to the regular program execution. This, for example, may be a very expedient tool to supervise continuously a particularly critical part of the program execution, to make sure that the program is executed properly. Particularly, in case the machine runs in a real time mode such continuous supervision may well be necessary. It is to be pointed out, however, that this is a capability and not a restriction. Within the program, for example, following the particular instruction identified by the A-register there may be an instruction sometimes called "read-direct." This is an instruction of general usage and provides for the direct transfer of the content of a designated register to a register which is contained or is part of the CPU's private memory, sometimes called register memory or register block. Details are enclosed, for example, in U.S. Letters Pat. No. 3,594,732. Specifically here, the SNAP-register can be identified by and in such a read-direct instruction for accessing. The "read-direct" instruction has also a block or a general purpose register address identifying directly or indirectly a particular location in the CPU's priviate memory to which the content of the snap-shot register is transferred.

Execution of this instruction "read-direct" requires less than one memory cycle, as any transfer to or from the general (core) memory facility is not involved. Thus, the inclusion of this instruction in the program is of little consequence for program execution time. At some later time a transfer from the register memory to core memory, and, later for example, to a memory extension device, can be carried out when convenient, and is needed only when there is frequent snapshooting. This then leads to the additional possibilities of using the snap feature for extensive diagnostics.

FIG. 3 is a graphic representation of a test point-time continuum involved. The w-axis defines the number of test points per set (which is a fixed, machine parameter e.g. 32), and the *j* axis defines the particular set with *n* being the maximum number of sets in the system. *n* is also a hardware parameter, but not necessarily a constant, as the number of test points may vary from system to system. This may be particularly so if the test points extends to the I/O system which may be customer engineered. The number of memory banks is also variable from system to system. Therefor, the total number of test points is conceivably a variable.

The third axis is called i-axis and denotes clock pulses. For each operational state as defined by the content of the A-register (e.g., for each instruction), there is a particular maximum number *m* of clock pulse cycles marking total execution time. That number *m* is different for many instructions and is, therefor, also a variable.

It can readily be seen that two basic test sequences are available in this system. First, *j* can be varied by changing the content of the N-register. As stated above, the N-register can be a shift register or counter which is incremented by machine operation, e.g., after each snapshot. Alternatively, as described below, the content of register N can be reloaded by computer operation providing specified register loading as part of program execution. The number *j* should be varied if the number of test points encompassed in one set is not sufficient to provide a complete representation of the operational state of the system during one particular clock phase. Not necessarily, all test points have to be tested always, but at least for some cases, i.e., for some instruction testing of a complete frame, i.e., testing of all *n X w* test points, is necessary so that the content of the N-register should be changed accordingly. Preferably, the change for *j* is from 1 to *n*, for a total of *n* different snapshots.

The second test sequence involves more than one, some or even all of the clock phases of an operation as indirectly defined by the content of the A-register. Therefore, the content of the M-register must be varied. Conceivably, the number *i* is varied from one to the maximum number m of different clock phases and steps, the maximum m being the maximum for the particular operation as defined by the instruction to be tested. The m different snap-shots for one value of *j* should be called a "movie". This "movie" represents the signal development on the test points of one set during the entire period of executing the operation as defined by the A-register, i.e., for all phases in proper sequence.

A complete test sequence involves both types whereby one "movie" after another is taken for all test points. This is now explained with reference to FIG. 4 showing an operational sequence in the form of a simplified program chart that is carried out by software, but could readily be implemented by hardware as will become apparent during the description.

Figure 4:
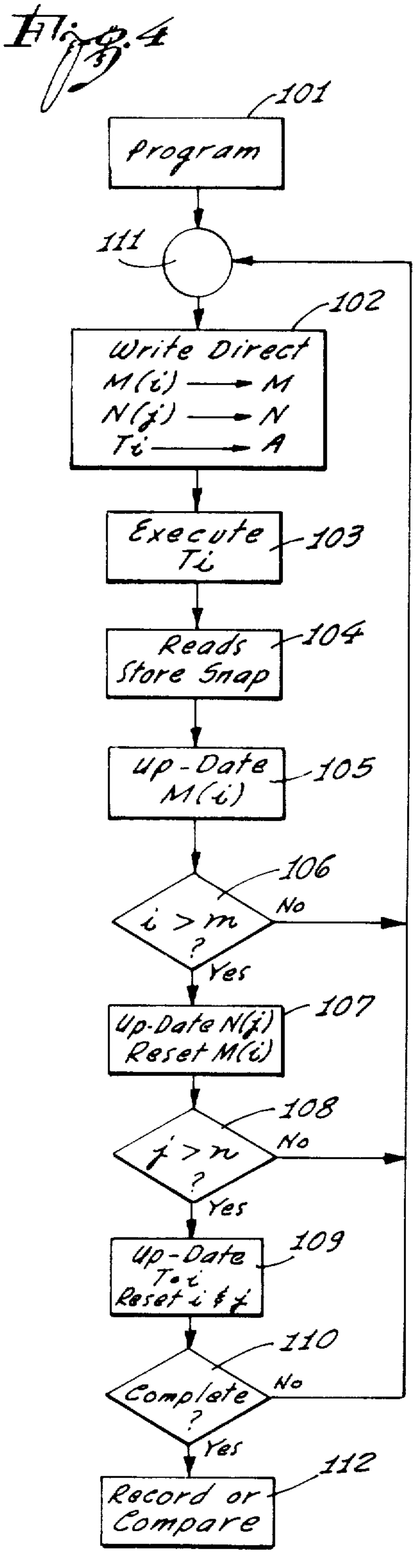

Turning, therefore, to FIG. 4, the program test sequence is entered into at 101, which should be part of the diagnostic set-up operation. As for block 102, a sequence of instructions is carried out; which includes a load instruction pursuant to which one register of the register block in the CPU receives particular information. The memory locations are separately identified as M (*i*), N (*j*) and T*i*. The memory location holding the number *j* to be set into the M-register is schematically represented by M (*i*); the memory location holding the number *i* to be set into the N-register is schematically represented by N (*j*); the memory location holding the address for the test instruction is denoted T*i*.

The particular information held in these memory locations is then distributed in the snapshot logic by a particular one of the so-called "write-direct" instruction. The "write-direct" instructions are provided for that purpose, namely for loading specified registers in the CPU other than the accumulator (see U.S. Pat. No. 3,594,732, supra). That information now includes two different *i* and *j* numbers, respectively set into the M- and N-registers, and a particular memory address number, which is set into the A-register. The memory location defined by that address holds the test instruction as stated.

The initial diagnostic set-up has loaded Ti as desired by the diagnostic procedure, whereby the particular numbers 1 (decimal) are set into M (*i*) and N (*j*). Therefore, the snapshot logic is prepared with numbers 1 in the M- and N-registers, and an instruction address in the A-register.

As per block 103, the program proceeds to call that location and the instruction is executed. The instruction repertory may include an instruction called "execute" pursuant to which the instruction held in the location as defined by the reference or operand address of the "execute" instruction is being executed. The comparator 17 in the snap logic will determine agreement, and the number 1 will then be copied from the M-register into the *i* counter 18. Dectector 21 responds after the next clock and "snaps." As per block 104, the "read-direct" instruction is executed, to transfer the content of the SNAP-register to a register in the CPU's register memory block, followed by a transfer to a designated memory location followed, in turn, by a subroutine or operation updating that location in preparation for the next transfer.

As per block 105, the content of memory location M ($i$) is incremented by software counter operation followed by testing whether $i + 1 > m$, $m$ being the maximum number of clock phases and steps for all operations carried out upon execution of the test instruction. As long as the updated number $i$ is not larger than $m$, the program returns to entry point 111. Now, again, the block 102 is executed; the number 2 is loaded into the M-register, the other registers are in effect reloaded as before, which is inconsequential because it merely puts the same content in the N- and A-registers they had before. That loop continues until $i + 1$ is larger than $m$, which signals the completion of a "movie" for the first set. The "snap-shots" that make up the "movie" have been sequentially stored, for example, in sequential addresses in core memory during that loop.

The following should be interjected here. The number m of clock phases may not be known, as some instructions have variable length. Therefor, in lieu of testing as per block 106 for the first "movie," the snap logic may include a circuit 25 which determines whether a particular clock phase is the last phase for that instruction. One of the test points of the first set is responsive to the termination of the execution of any instruction. Such signal is developed in the CPU when the next instruction is to be fetched. Such signal will be false except on the last clock phase for any instruction. As the "movie" for that set is taken, snapshot after snapshot is taken until circuit 25 responds. The response of circuit 25 may serve as a condition which stops skipping of the test 106. The number then held in the M ($i$) location is now the desired number $m$ for the test and will be stored separately for the test (106) to be performed on subsequent "movies."

As the program continues along the branch 106 - $y$, the number in memory location M ($i$) is reset to 1, and the content of memory location N ($j$) is incremented (block 107). Both operations are software counter operations involving the content of the memory locations M ($i$) and N ($j$). As per block 108, it is tested whether the incremented number $j$ is larger than $n$, if not the program loops back to entry point 111 and now the next "movie" is taken for that second set of test points.

This double loop operation will continue until "$n$-movies" have been taken and properly stored whereupon the program proceeds along line 108 -$y$. Next, block 109 may, for example, be all for an operation to update the test instruction, while both software counters for $i$ and $j$ are reset to 1. At 110 completion of the test program is tested which is an arbitrary criterium. If the test is not completed, the program goes back to entry point 111 for closing a triple loop. If the test program is completed, the program continues to 112.

Operational block 112 denotes various possibilities of program continuation. One possibility is to have the content of the memory locations that hold the various "movies" compared with reference "movies" as part of the diagnostic operation. In case disagreement in any or several stored snapshots-test point sets is found, an appropriate indication is produced. The test result can be expected to be printed out or suitably presented otherwise in an I/O operation. Alternatively, the various "movies" may be outputted directly on a chart for inspection by a human operator. If found to be satisfactory, the "movie" can be stored in the computer elsewhere to be used as reference for later testing as described. In other words, the reference pattern itself may result from snapshot shooting as described.

It will also be apparent that the program sequence as described with reference to FIG. 4 may well be implemented by hardware. As stated, N and M registers may be true counters, with counter M incremented by each snapshot, and counter N incremented whenever M counter reaches number $m$, whereupon the M counter is also reset. If the condition sense circuit 16 connects to the program counter, the snap-shot circuit can also simply reset the program counter so that the test instruction is re-executed.

While the SNAP-register has been described as a register, the facility may well be a plurality of push-down registers, so that with each reloading of the SNAP-register by the output of gates 15, the previous "snap-shots" all propagate one position down. This way, snapshots can be taken, for example, with each clock pulse during execution of an instruction.

Figure 5:
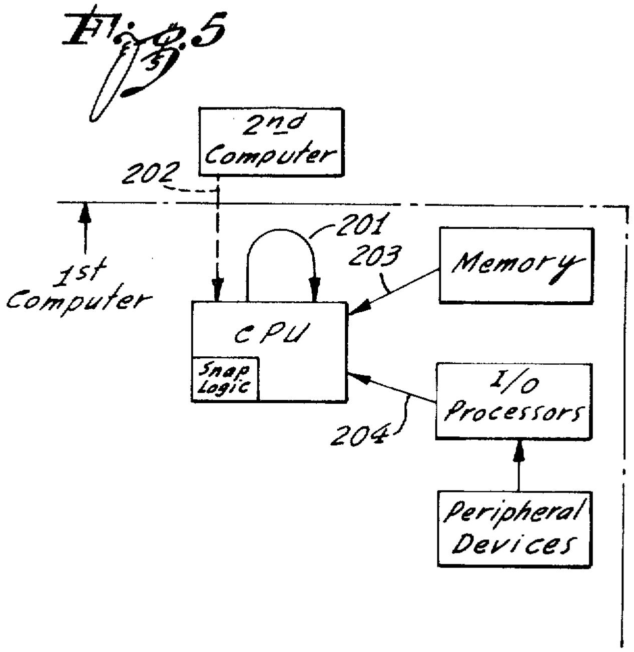

Turning finally to FIG. 5, this figure merely shows the various possibilities of testing. The snapshot logic of FIG. 1 is presumed to be contained in and a part of the CPU. The loop 201 symbolically denotes that test point lines of the plurality 11 may lead to test points within the CPU, so that the CPU is self-testing. The test point connections so made are certainly useful for the most part, but for some faults there is the limitation that the test circuit may "cover" faults because of its own defectiveness. Nevertheless, many error situations are completely adequately detected. For a higher degree of reliability (particularly for initial check-out), test point lines should be strung from a second computer to the one to be tested, particularly, the CPU thereof. However, such lines 202 may well be restricted to test points in the snap logic of the CPU of the first computer and when found satisfactory, the snap logic may proceed with self-testing.

No self-testing is present as to test point connections 203 leading from the memory via the CPU-memory interface to the CPU. Full diagnostic operations can be carried out here. Of course, it has to be considered here that the tested operations involve those carried out during memory access, read and write cycles. Any such operations begin with the providing of a memory address by the CPU to the memory. Therefor, clocking ($i$-counting) should begin at that point. On the other hand, it must be realized that the memory may run on its own clock that is asynchronous to the CPU clock. Therefor, the circuit in FIG. 1 should include alternative clock paths, enabled with the selection of test point sets from memory so that the clock phase determination of snap shooting is properly synchronized to the memory clock.

Other test point lines, 204, of the plurality may lead to the input/output processing facilities (sometimes called channels) which perform autonomously and largely independent from the CPU. These I/O processor facilities are also run by their own clock, so that the $i$-selection must be synchronized accordingly.

While there have been shown and described the fundamental novel features of the invention as applied to a preferred embodiment, it will be understood that changes in the form and details of the invention may be made by those skilled in the art without departing from the spirit of the invention. It is the intention, therefore, to be limited only as indicated by the scope of the appended claims.

I claim

1. In a stored program digital computer, which includes memory, CPU and input/output equipment, for carrying out computing programs by executing instructions, there being data paths in the computer through which flow data pursuant to regular operation of the computer, the execution of instructions being carried out in steps defined by clock phases, the improvement of a monitoring system for the computer for monitoring operation without intervention and interruption of execution of an instruction, comprising:

a plurality of $n$ X $w$ test points in at least a portion of the computer circuit, each of the test points developing signals during operation of the computer, $n$ and $w$ being positive integers;

plural connecting hardwired test lines, permanently connected to the test points separately from any said data paths in the computer;

first means connected to said connecting hard-wired lines and provided for selecting $w$ particular ones of the test points and including selectively operating switching means for obtaining the selecting of the particular ones of the test points;

second means including a register connected to the first means and provided for receiving the w signals as developed by the $w$ test points and as selected by the first means and temporarily storing the $w$ signals as an assembly of $w$ unrelated bits;

third means connected to be responsive to a preselected phase in the operation of the computer including means (a) for being responsive to execution of a selectable instruction by the CPU; and means (b) for being responsive to a preselected clock phase in the execution of the selectable instruction when executed for determining said operation phase; and fourth means connected for enabling the second means so that the register of the second means receives said developed signals at the instance of response of the means (a) and of the means (b).

2. In a computer as in claim 1, whereby the means (a) is responsive to a memory address when called on by the CPU as holding an instruction during which the phase is to occur.

3. In a computer as in claim 1, including means for controlling selection of the test points by the first means.

4. In a stored program, digital computer which includes memory, CPU and input/output equipment and having a plurality of registers, the CPU including means responsive to particular instructions for loading specified registers of the plurality of registers, the CPU further including means for being responsive to other instructions for reading specified registers of the plurality of registers, the CPU further including means for performing counting and count number testing operations, the improvement of a monitoring system operating independently from regular computer operation, comprising:

a plurality of $n$ X $w$ test points in at least a portion of the computer circuit, each of the test points developing signals at different levels during operation of the computer, $n$ and $w$ being positive integers;

plural connecting hardwired test lines permanently connected to the test points and holding signals representing the respective signal level at these test points;

a select matrix connected to said connecting test lines, and having $n$ selection lines respectively for selecting $n$ groups of $w$ connecting lines each, and out of said $n$ X $w$ connecting lines, further having w output lines holding the signals of the group of the respectively selected test lines;

first means including a first register of the plurality of registers and connected for selecting one out of said $n$ selection lines in dependence upon the content of the first register;

a second register of the plurality for receiving the signal content of the $w$ output lines;

second means connected to be responsive to the progressing phases of execution of any instruction by the computer;

a counter connected to the second means to count the said progressing phases of an instruction when executed;

third means responsive to the counter having reached a particular count state to provide a timing signal;

gating means connected in-between the output lines of the select matrix and said second register and further connected to receive said timing signal for setting the content of the said output lines into the second register in representation of the individual signal levels of those test points which are connected to the respective selected ones of the test lines;

said computer operating to read the second register subsequently and further operating to update the content of the first register to change the selection from among the $n$ selection lines and connecting lines accordingly; and means for selecting a particular instruction which, when executed, causes the third means to provide the timing signal when the counter reached the particular count state during execution of the selected particular instruction.

5. In a computer as in claim 4, the third means including a third register, the computer operating to update the content of the third register, the third means further including means to transfer the content of the third register to said counter.

* * * * *